(12) United States Patent
Kaplan et al.

(10) Patent No.: US 10,503,811 B2
(45) Date of Patent: Dec. 10, 2019

(54) ACQUISITION OF A FONT PORTION USING A COMPRESSION MECHANISM

(71) Applicant: Adobe Inc., San Jose, CA (US)

(72) Inventors: Gregory A. Kaplan, Seattle, WA (US); Bram Stein, Søborg (DK)

(73) Assignee: Adobe Inc., San Jose, CA (US)

(*) Notice: Subject to any disclaimer, the term of this patent is extended or adjusted under 35 U.S.C. 154(b) by 400 days.

(21) Appl. No.: 15/056,470

(22) Filed: Feb. 29, 2016

(65) Prior Publication Data

US 2017/0249286 A1 Aug. 31, 2017

(51) Int. Cl.
- G06F 17/21 (2006.01)
- G06F 17/22 (2006.01)
- G09G 5/24 (2006.01)

(52) U.S. Cl.
CPC ........ G06F 17/214 (2013.01); G06F 17/2205 (2013.01); G06F 17/2217 (2013.01); G09G 5/24 (2013.01); G09G 2340/02 (2013.01); G09G 2370/022 (2013.01)

(58) Field of Classification Search
CPC .... G06F 17/214; G06F 17/2205; G06F 17/17; G09G 5/24
USPC ......................................................... 715/269
See application file for complete search history.

(56) References Cited

U.S. PATENT DOCUMENTS

| | | | | |
|---|---|---|---|---|
| 6,313,920 B1* | 11/2001 | Dresevic | ................ | G06K 15/02 358/1.11 |
| 6,771,267 B1* | 8/2004 | Muller | .................... | G06T 11/00 345/467 |
| 7,155,672 B1* | 12/2006 | Adler | .................... | G06F 17/214 715/210 |
| 8,643,652 B2 | 2/2014 | Kaplan | | |
| 2008/0028304 A1* | 1/2008 | Levantovsky | ........ | G06F 17/214 715/269 |

(Continued)

OTHER PUBLICATIONS

Compressed Bloom Filters; Michael Mitzenmacher; <http://www.eecs.harvard.edu/~michaelm/NEWWORK/postscripts/cbf2.pdf>; Published Dec. 10, 2002 (Year: 2002).*

(Continued)

*Primary Examiner* — Stephen S Hong
*Assistant Examiner* — Broderick C Anderson
(74) *Attorney, Agent, or Firm* — SBMC

(57) ABSTRACT

Acquisition of a font portion using a compression mechanism is described. In certain embodiments, an end-user device determines multiple characters to be displayed but are missing from a local font. The end-user device computes a compressed representation of the multiple characters based on multiple code points corresponding to the multiple characters. The end-user device transmits a font request including the compressed representation to a font repository. The font request may be implemented as a uniform resource locator (URL). The font repository, such as a server, decodes the compressed representation to identify at least the multiple code points encoded by the end-user device. The font repository prepares a font description including glyph data corresponding to the multiple code points and returns the font description. The end-user device produces a local font that includes at least multiple glyphs corresponding to the multiple requested characters. The local font production may include font augmentation.

20 Claims, 9 Drawing Sheets

(56) References Cited

U.S. PATENT DOCUMENTS

| | | | |
|---|---|---|---|
| 2011/0271180 A1* | 11/2011 | Lee | G06F 17/21 |
| | | | 715/269 |
| 2013/0054547 A1* | 2/2013 | Kuettel | G06F 17/214 |
| | | | 707/693 |
| 2013/0127872 A1* | 5/2013 | Kaplan | G06T 11/203 |
| | | | 345/467 |
| 2013/0325795 A1* | 12/2013 | Harris | G06F 17/214 |
| | | | 707/608 |
| 2015/0161081 A1* | 6/2015 | Stell | G06F 16/93 |
| | | | 715/234 |

OTHER PUBLICATIONS

Kirsch,"Less Hashing, Same Performance: Building a Better Bloom Filter", Retrieved at: https://www.eecs.harvard.edu/~michaelm/postscripts/rsa2008.pdf, Jul. 11, 2007, 32 pages.

"Combined Search and Examination Report", GB Application No. 1622018.8, dated May 30, 2017, 5 pages.

"Foreign Office Action", GB Application No. 1622018.8, dated May 8, 2019, 5 pages.

* cited by examiner

ACQUISITION OF A FONT PORTION USING A COMPRESSION MECHANISM

BACKGROUND

The internet, especially the World Wide Web (WWW) or the Web, enables many services to be provided across the planet. Two examples of services are communication and commerce. These and other services are provided for and between web users having a multitude of different educational levels, aesthetic preferences, language capabilities, and so forth. Consequently, the Web has been adapted to accommodate the vast diversity of people that are from different countries or that live in different cultures.

One accommodation by the Web is a capability to use many different fonts. Fonts are digital files or code that represent instances of digital typefaces. Examples of typefaces include Courier, Helvetica, Literata, Times New Roman, and Bookerly. An example of a font is a file (e.g., "Helvetica-Bold.otf") that represents a style of a typeface, such as bold Helvetica. Each font embodies a unique style and is often designed for one or a few related languages. A given electronic font or family of fonts can have options for different point sizes, various effects such as bold or italics, and so forth. Using a selected font, a computing application can cause characters to be presented on a display screen of an electronic device as glyphs respectively corresponding to the characters. For example, a web browser can display, on a screen of a smart phone, text from a web page using a locally-stored font.

To accommodate the diversity of languages and cultures of the people of the World, many different fonts have been created. The variety of existing fonts enables people of different languages and cultures to enjoy the Web in their own way. To achieve this, one font may differ markedly from another font. Further, a definition of a font may include not only an explanation of how individual characters are formed, but also an explanation of how each character relates to or interacts with other characters. A font definition can therefore be large and consume a significant amount of data, which places demands on both storage and transmission bandwidth capabilities of an electronic device. Consequently, individual electronic devices can only store a limited number of font definitions. Additionally, conveying a font definition to an end-user device to enable characters to be displayed using the font causes perceptible time delays that are aggravating to an end-user. Furthermore, with a metered connection such as with many cellular service plans, financial constraints can also hinder the downloading and thus the usage of different fonts.

SUMMARY

Acquisition of a font portion using a compression mechanism is described. An end-user device may encounter textual content having multiple characters of a specified font that are not present locally at the end-user device. Each individual character has a visually discernable form that connotes meaning to a viewer of a glyph corresponding to the character. A character may include, for example, a letter of an alphabet, an ideograph, punctuation, an emoji, a textual unit, or any other human-readable or interpretable form that can be encoded as text using a computing device. In contrast, a glyph is a specific rendition or graphical representation of an encoded character as supplied via a font.

Instead of obtaining the entirety of the specified font, the end-user device acquires a portion of the font using a compression mechanism for a font request to save time and reduce a transmission bandwidth. The end-user device sends to a font repository the font request having a compressed representation that enumerates the missing characters. In response, the font repository returns a font description for the missing characters that includes data describing the glyphs corresponding to the requested characters. If no portion of the specified font is previously present at the end-user device, the data for the corresponding glyphs is used to establish a new local font for the specified font. If, however, some part of the specified font is already present at the end-user device, the data for the corresponding glyphs is added so as to augment an existing local font.

More specifically, in certain example embodiments for an end-user device, a font instantiation module determines multiple characters that form a portion of a font definition for a particular font and that are to be used to render corresponding glyphs. The font instantiation module ascertains multiple code points, such as Unicode code point values, that respectively correspond to the multiple characters. A compressed representation of the multiple characters is computed based on the multiple code points. The font instantiation module can compute the compressed representation using, for example, one or more hashing functions that are lossless with regard to inclusion. Thus, decoding the compressed representation may produce false positives at a font repository, but false negatives are not permitted. In other words, each character, as represented by a code point, that is intended to be requested by the end-user device is returned by the font repository in the form of corresponding glyph data responsive to the compressed representation. However, glyph data for additional unintended characters may also be returned. The compressed representation may be implemented as, for instance, a probabilistic data structure, such as a Bloom filter.

The end-user device communicates to the font repository a font request that includes the compressed representation. The font request may be implemented, for example, as a URL having the compressed representation embedded therein. In response to transmission of the font request, the end-user device receives from the font repository a font description corresponding to the compressed representation. The font instantiation module at the end-user device uses the font description to produce a local font that includes glyph data for at least the requested characters. The font description can be used to establish a new local font that has a subset of a full font definition, or the font description can be used to augment an existing local font by adding glyph data to the existing local font in accordance with an augmentation instruction received as part of the font description.

In certain example embodiments for a server device, the server device receives from an end-user device a compressed representation corresponding to multiple characters that are being requested for a particular font definition. A font instantiation module decodes the compressed representation to identify multiple code points. For example, the font instantiation module may apply an encoding process to each code point of a set of code points in a font definition and determine if a coding result comports with the compressed representation. If the coding result of a character's corresponding code point matches fields included in the compressed representation, the character is deemed to be requested. Although each character or code point that is deemed to be requested may not have actually been intended to be requested by the end-user device, each analyzed code point for each character having a matching coding result should be so deemed. In other words, the server device is to return glyph data corresponding to each code point that appears to actually be requested, even if glyph data for some additional, non-requested code points are also returned.

The font instantiation module of the server device ascertains multiple characters that correspond to the multiple code points having matching coding results. The font instantiation module accesses the font definition to extract multiple font attributes for the multiple ascertained characters. For example, vector representations of glyphs, proper spacing between glyphs, or an order of glyphs in the font definition may be extracted as font attributes. The font instantiation module prepares a font description corresponding to the compressed representation based on the multiple extracted font attributes. The font description includes glyph data that enables the end-user device to render the multiple characters as part of a local font at the end-user device. In a font augmentation scenario, the font description may also include at least one augmentation instruction for injecting additional glyphs into an existing local font to maintain overall font usability. After preparing the font description, the server device transmits the font description to the end-user device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1:
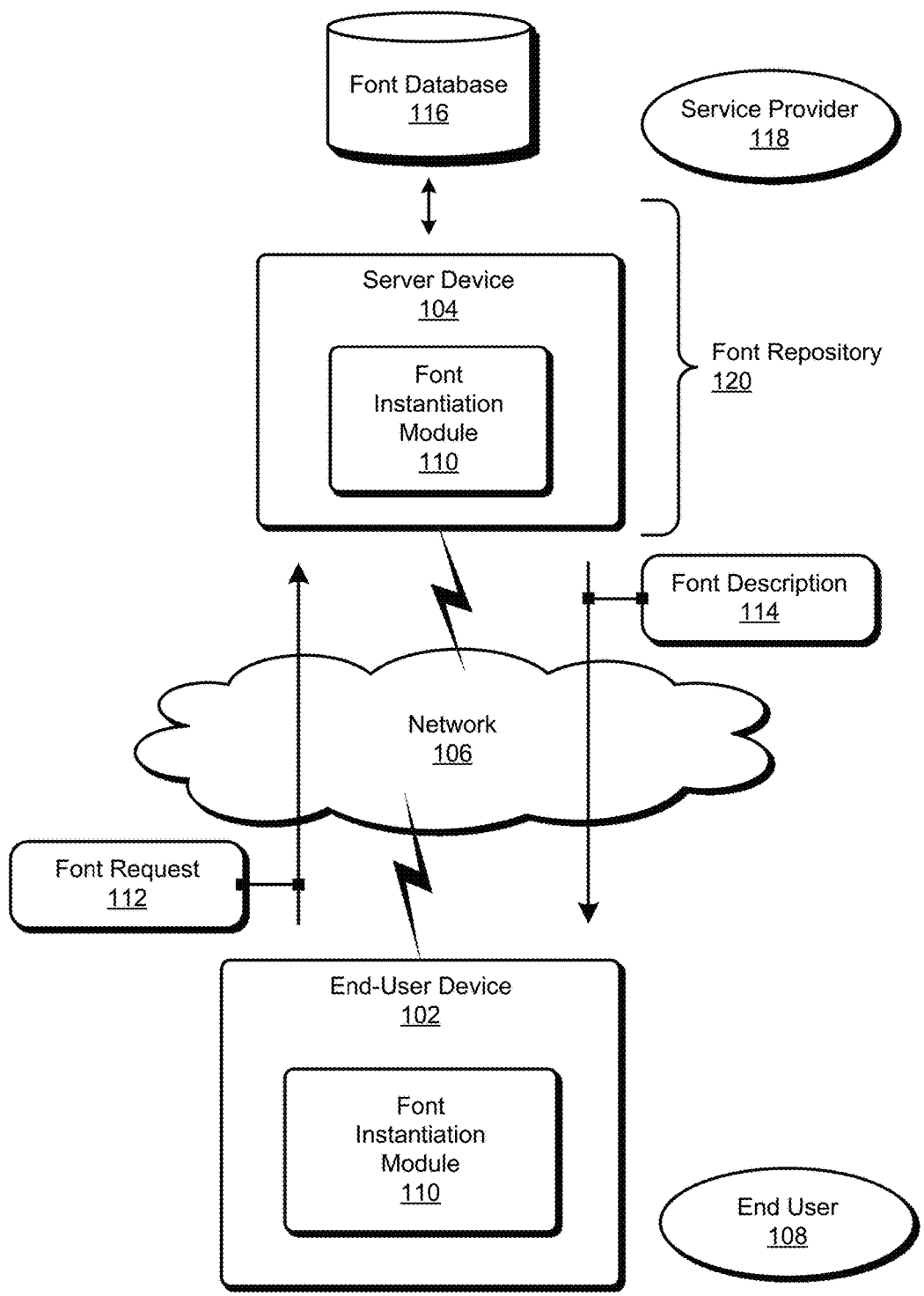
FIG. 1 illustrates an environment for example embodiments that are operable to employ techniques described herein that relate to acquisition of a font portion using a compression mechanism.

Website creators, such as web designers and web developers, strive to make web pages that are appealing to a target audience. Website creators often tailor a website for the culture, country, or aesthetic sensibilities of a target audience. One approach is to deploy some of the latest web technologies so that the website can present content dynamically in a manner that appears modern and adheres to the latest web-related trends. Another approach involves employing a font that is familiar to, or that matches a desired image in the minds of, the target audience. The target audience may be defined in terms of age, hobbies, preferred language, culture of birth, country of residence or origin, attained educational level, economic group, and so forth.

Thus, selection of an appropriate font may entail consideration of many different factors. For example, a style that will convey a desired image or a language read by a target audience may be considered. As another factor, a tradeoff may be made between font uniqueness and ease of readability. Further, an expected consumption device—such as a smart phone or a desktop computer—may be considered. A multitude of fonts have been produced to accommodate these various factors. In fact, there are many thousands of different fonts used on the web today. For a device to render glyphs (e.g., specific forms of characters) in accordance with a given font, the device uses a locally-stored version of a font definition for the font. A full font definition, however, can occupy many megabytes of data. For instance, a full font definition for an ideograph-based language can occupy approximately 20 megabytes. Consequently, a consumer electronics device, especially a portable or low-resource one, cannot easily store the full font definition for multiple fonts, much less for each of the fonts that are used on the Web.

Provisions have therefore been established using web technologies to enable font definitions to be downloaded on demand for a given web site. In practice, multiple font definitions are stored in the cloud at a font repository, such as a web server that has access to a database storing many fonts. A snippet of code, which is included as part of a webpage, can request at least part of a font definition from a font repository. For example, a portion of a webpage can include JavaScript that, if executed by a browser, contacts at least one web server to retrieve a font definition for use by the web browser in rendering glyphs to display the webpage.

If a full font definition is desired, the code snippet can merely identify the requested font by name, alphanumeric code, or similar font identifier. However, if a font subset or font augmentation is desired, the individual characters to be requested are enumerated. If only a few characters are desired, there is usually little difficulty submitting to a web server a request that enumerates the specific characters being requested. On the other hand, a difficulty arises if many characters are being requested. A situation in which many characters are being requested is likely to occur if a webpage uses multiple different fonts or if a font contains thousands of characters, such as those used for some ideograph-based Asian languages, like Chinese, Korean, and Japanese.

Using web technologies, a resource is often requested with a uniform resource locator (URL). URLs, at least for reliable usage, have a limited maximum length. This limitation arises because some web servers and some proxy servers on the Web operate under older standards, as well as because some older browsers are still in use. If, for example, four hundred individual characters of a font are desired and each character is identified by four numerals (e.g., a four-digit number), a URL-based request for the desired characters would exceed the maximum length of a URL for older web servers and proxy servers. There are a number of possible approaches that may ameliorate this limitation, but each such approach introduces new problems. Two specific problematic approaches are described next, as well as reasons militating against adopting these two approaches.

With a first problematic approach, the desired individual characters can be separated into multiple groups that jointly or in combination include all of the desired individual characters. A separate request for each of the multiple groups can then be made to a font repository. Such multiple separate requests, however, increase the delay caused by obtaining a font portion from a remote source prior to being able to display a web page. Furthermore, multiple separate requests increase a likelihood of an error being introduced as multiple font portions are received and incorporated into a local font at an end-user device.

With a second problematic approach, a request for a font can be effectively divided into two stages. In a first stage, a web browser at an end-user device enumerates the desired characters to a first web server with a first communication. In a second stage, the web browser makes a request with a second communication to a second web server acting as a font repository with a reference to the enumeration of the desired characters that is located at the first web server. After contacting the first web server with a third communication, the second web server can provide the requested characters to the web browser. Thus, this second approach also entails multiple communications that introduce additional delays before a font portion can be downloaded and used. Moreover, two different web servers are contacted, which complicates the process and can result in errors.

From a more technical perspective, older web servers and proxy servers on the internet are unable to process URLs that exceed 2,048 characters. Because a path of a communication on the internet is nondeterministic, the proxy servers through which a communication is going to travel is unpredictable. Accordingly, to implement a reliable scheme for font acquisition, the 2,048 character limit is to be adhered to. One way to identify different characters is to use the Unicode code point corresponding to each respective character. Unicode code point values may be four characters long apiece and separated by commas. A list of 400 unique Unicode code points, if incorporated into a URL, would therefore result in a URL of no fewer than 2,000 characters. Consequently, directly incorporating Unicode code points into a URL does not produce a reliable scheme in view of the older web and proxy servers that can still be encountered on the Web.

With regard to the second problematic approach described above, an enumeration of the Unicode code points that are usable to fulfill a request for a font portion is compiled by a client application, such as a web browser executing a script from a web page. Because the length of that request is potentially too long to safely include in a URL, the web browser instead first makes a Hypertext Transfer Protocol (HTTP) POST request to a first web server to define the Unicode listing as part of the first stage. An HTTP POST request message asks that a web server accept and store the data enclosed in the body of the request message. The HTTP POST request message is not encumbered by the same size limitations as a URL because the data are not included in the URL proper. The Unicode listing may be hashed and then bundled with a key as part of the HTTP POST request. The key can subsequently be used to request a specific font portion from a second web server as part of the second stage. The second web server can obtain the Unicode listing from the first web server using the key. Unfortunately, this two stage process is inefficient.

In contrast, in accordance with one or more embodiments that are described herein, a single stage approach can utilize one URL to acquire a portion of a font based on a compression mechanism. In a web browsing scenario, a web browser creates a list of desired characters, such as those characters corresponding to glyphs that are to be rendered on a display screen. The web browser compresses a listing of identifying code points corresponding to the desired characters to generate a compressed representation of the desired characters. The web browser embeds the compressed representation in a URL and sends the URL to a web server acting as a font repository. The font repository receives the URL and then extracts and decodes the compressed representation. The web server ascertains those characters that correspond to the decoded code points and prepares a font description having glyph data for rendering those glyphs that correspond to the ascertained characters. The web server transmits the font description to the web browser for use in rendering text that includes the requested characters.

More specifically, in certain example embodiments for an end-user device, a computing application determines that multiple characters forming a portion of a specific font definition are desired to render an electronic file, such as a document. The computing application ascertains (e.g., collects) the multiple code points, such as multiple Unicode code point values, that respectively correspond to the multiple desired characters. A compressed representation of the multiple characters is computed based on the multiple code points. The compressed representation may be computed using, for example, one or more hashing functions that are lossless with regard to inclusion. Thus, decoding the compressed representation may produce false positives at a font repository, but false negatives are not permitted. In other words, each intended requested character will be returned by the font repository, but additional unintended characters may also be returned. The compressed representation may be implemented as a probabilistic data structure, such as a Bloom filter.

The end-user device communicates to the font repository a font request that includes the compressed representation. The font request may be implemented, for example, as a URL having the compressed representation embedded therein. In response to transmission of the font request, the end-user device receives from the font repository a font description corresponding to the compressed representation. The computing application uses the font description to produce a local font that includes glyph data for at least the intentionally requested characters. The font description can be used to establish a new local font that has a subset of a full font definition, or the font description can be used to augment the local font by adding glyph data to an existing local font.

Additionally, in certain example embodiments for a server device, the server device receives from an end-user device a compressed representation corresponding to multiple characters that form a portion of a font definition. The server device decodes the compressed representation to identify multiple code points. For example, the server device may apply an encoding process to each code point of a set of code points and determine if a coding result comports with the compressed representation. If a tested coding result matches a code point included in the compressed representation, the corresponding character is deemed to be requested. Although each character that is deemed to be requested may not have actually been intended to be requested by the end-user device, each character corresponding to a tested code point having a matching coding result should be so deemed. In other words, the server device is to return each character that appears to have been requested as per the compressed representation, even if some additional, unintentionally-requested characters are also returned.

The server device ascertains multiple characters that correspond to the multiple code points having matching coding results. The server device accesses the font definition to extract multiple font attributes for the multiple characters. For example, vector representations of glyphs, proper spacing between glyphs, or an order of glyphs in the font definition may be extracted as font attributes. The server device prepares a font description corresponding to the compressed representation based on the multiple font attributes. The font description includes glyph data that enables the end-user device to render glyphs corresponding to the multiple characters as part of a local font of the end-user device. The font description may also include at least one augmentation instruction for injecting additional glyph data into an existing local font to maintain overall font usability in a font augmentation scenario. The server device transmits the prepared font description to the end-user device.

In these manners, a portion of a font can be acquired at an end-user device from a font repository using a compression mechanism. The acquisition can be effectuated in one stage with a single request to a single server. An enumeration of the desired characters forming the portion of the font may be condensed into a compressed representation that is suitable for inclusion as part of a URL. The length of the URL can be sufficiently short such that older web servers and proxy servers are capable of handling the URLs serving as requests for font portions. The delays and complexities of making multiple requests or communicating with multiple servers can be avoided. Moreover, the vast diversity of fonts can be made available for use in different electronic files, such as with different web pages.

In the following discussion, after some example terminology is set forth, an example environment is described that may employ the techniques described herein. Example embodiment systems, machines, and techniques are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "font" refers to a digital representation (e.g., a file or some code) of a typeface or a specific style thereof. Examples of typefaces include Times New Roman, Helvetica, Calibri, Baskerville Old Face, Britannic Bold, Neuropol, Vladimir Script, and Courier New. Historically, each typeface was one particular point size because letters were made from individual physical stamps. In modern digital environments, however, a font can include or be usable to produce characters at many different point sizes. A font may also be considered to include basic style variations or effects, such as italics or bold. Alternatively, different point sizes and different basic effects may be packaged as separate fonts. Multiple different fonts may be directed to a same single language, or a single font may cover multiple different languages, such as multiple different Western European languages. A "font repository" refers to a location, entity, module, service, device, or combination thereof that has access to multiple font definitions and is capable of distributing at least portions of the font definitions to requesting users, modules, devices, and so forth.

A "character" refers to the concept or abstraction of a unit of text. Examples of characters include a letter of an alphabet, a symbol, an ideograph, punctuation, an emoji, a logogram, or any other human-readable or interpretable form that can be represented as text using a computing device. A character corresponds to a glyph. A "glyph" refers to a physical shape or form that is perceivable by the human eye and connotes the corresponding character. A computing device renders a glyph on a display screen or on a physical hard copy. A glyph is specific to how a particular font renders the glyph, but a character transcends multiple fonts. A character or a glyph may be assigned to or may correspond to a code point. A "code point" refers to a defined or an accepted representation of, or a code or encoding for, a given character. Examples of code points include numbers, alphanumeric characters, binary-encoded digits, a general character identification, a Unicode code point, Big5, ShifJIS, ASCII, or a combination thereof. A code point may be realized in digital form as, for instance, a non-negative integer, a string, and so forth. Because of the close correspondences between and among "character," "glyph," and "code point," the terms are occasionally used somewhat interchangeably herein. For example, although code points are actually used to construct a compressed representation, the compressed representation may be referred to as corresponding to the requested characters. As another example, although characters are requested using corresponding code points, the returned font description includes data corresponding to, and enabling the rendering of, glyphs. In a sense, the abstract concept of a character may be realized as a computer-recognizable character identifier called a code point or as a human-recognizable form called a glyph, which may also be font-specific.

A "font definition" refers to instructions or other information that are usable to generate or render glyphs of a corresponding font, such as instructions for a vector-based incarnation of the glyphs. A font definition may also describe how one glyph interacts with one or more other glyphs with regard to spacing between two glyphs, combining two glyphs into another glyph, and so forth. A font definition may include such information for each glyph that is designed into a given version of the font. In other words, a font definition may pertain to an entirety of a font. In contrast, a "portion of a font definition" refers to multiple glyphs of a font definition, but fewer than all of the glyphs included as part of the original or full font definition. A portion of a font definition is analogous to a proper or strict subset of a font. An example of a portion of a font is the letters G, M, and Z for a font definition for the Cronos Pro font that covers the 26 letters of the English alphabet. A portion of a font may be requested in a font subsetting scenario in which a new local font is being established with just a proper subset of a font instead of a full font definition. A font subsetting scenario is applicable to avoid having to download very large fonts. Alternatively, a portion of a font may be requested in a font augmentation scenario in which additional characters are to be used to augment an existing local font. A font augmentation scenario is applicable if more characters are being added to an electronic file unexpectedly or in real-time.

A "compressed representation" refers to data, such as a data structure, that includes, carries, or incorporates an identification of multiple individual characters in a space, size, or bandwidth that is less than the total space, size, or bandwidth consumed by the multiple individual code points that correspond to the multiple individual characters. A compressed representation for multiple characters may be created by applying a compression mechanism to multiple code points that correspond to the multiple characters. An example of a resulting data structure is a probabilistic data structure, which sacrifices some measure of precision or certainty in exchange for decreased size. A probabilistic data structure can be created as a Bloom filter or by applying one or more hashing operations to each of the multiple code points to be encoded in a compressed representation. Other types of probabilistic data structures may alternatively be utilized as a compressed representation.

A "font request" refers to a request from a font repository for at least a portion of a font definition. A font request includes a compressed representation of desired characters. A font request may also include a current state of a local font. An end-user device may send a font request to a server device that is coupled to a font database that stores multiple font definitions. The server device returns a font description.

A "font description" refers to glyph data that enables multiple glyphs of a portion of a font to be rendered by an end-user device. A font description is produced by a font repository from a font definition. A font description may also include information that enables production at the end-user device of a local font that includes at least glyphs corresponding to the multiple requested characters. Further, a font description may include at least one augmentation instruction to add glyph data to a current local font.

A "local font" refers to a font that is present at an end-user device and that is usable by the end-user device to render glyphs on a display or printer. A local font may include less than an entirety of a font definition. To "produce a local font" refers to creating a local font using a font description received from a font repository. A local font can be created by establishing a new local font as a font subset (e.g., a proper or strict subset) of a font definition using at least glyph data of a font description. Alternatively, a local font can be created by augmenting a local font by adding glyph data to an existing local font using at least glyph data and an augmentation instruction of a font description.

A "state of a local font" refers to information indicative of what portion of a font definition an end-user device currently has as a local font at the end-user device. For example, a state of a local font may be implemented as a data structure indicative of which glyphs of a font definition an end-user device is already capable of rendering. If an end-user device wishes to augment an existing local font, the end-user device may send a state of the local font to a font repository to inform the font repository of what glyph data is already possessed.

An "augmentation instruction" refers to information explaining how an end-user device can incorporate or add new glyph data into an existing local font to produce a new local font that enables the end-user device to render both previously-acquired glyphs as well as the newly-acquired glyphs using the new local font.

A "font instantiation module" refers to a module that is capable of manipulating font-related information to facilitate acquisition of a portion of a font using a compression mechanism to enumerate desired characters. A font instantiation module located at and executing on an end-user device can perform client-side operations as described herein. A font instantiation module located at and executing on a server device can perform font-repository-side operations as described herein.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 illustrates an environment 100 for example embodiments that are operable to employ techniques described herein that relate to acquisition of a font portion using a compression mechanism. As depicted from top to bottom, the example environment 100 includes at least one service provider 118, at least one server device 104, at least one network 106, at least one end-user device 102, and at least one end user 108. The end-user device 102 or the server device 104 may include at least one font instantiation module 110. On the upper or server side of the environment 100, FIG. 1 also depicts at least one font database 116 and at least one font repository 120. For an example operation, the environment 100 further includes at least one font request 112 and at least one font description 114.

In one or more embodiments, at least one font instantiation module 110 facilitates the end-user device 102 obtaining at least part of a font from the font database 116 via the server device 104 using the font request 112 and the font description 114. Hence, a font instantiation module 110 may at least partially implement one or more techniques or systems as described herein for acquisition of a font portion using a compression mechanism. A font instantiation module 110 may be located at, or executing on, the end-user device 102, the server device 104, some combination thereof, and so forth.

As shown, the end user 108 is associated with the end-user device 102, and the service provider 118 is associated with the server device 104. The end-user device 102 can be in communication with the server device 104, or vice versa, via the at least one network 106. The network 106 may be formed from at least a portion of one or more network types. Examples of network types include a public network, a private network, the Internet, the Web, an Ethernet, an intranet, an extranet, a local area network (LAN), a wide area network (WAN), a wireless network, a wired network, a cellular network, an infrastructure network, an ad hoc network, a Bluetooth network, a Wi-Fi network, a Long-Term Evolution (LTE) network, a public-switched telephone network (PSTN), or some combination thereof.

The end user 108, such as a web browsing individual, may request a web page that is suitable for rendering by a program, such as a web browser, using the end-user device 102. The end-user device 102 may be implemented as or may be configured as any suitable type of computing device. Examples of an end-user device 102 include a desktop computer, a laptop computer, a mobile device (e.g., assuming a handheld configuration such as a tablet, a mobile phone, or a phablet), a mobile device coupled to a separate screen, an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, or some combination thereof. Thus, an end-user device 102 may range from a relatively high-resource device with substantial memory and processor resources (e.g., a personal computer or a game console) to a relatively low-resource device with constrained memory or processing resources (e.g., a mobile device such as a wearable). At the end-user device 102, the font instantiation module 110 may be a standalone application, may be included as part of another application, may be a portion of a web browsing application, may include native code, may include run-anywhere code, may be a downloaded application or extension, may be part of a library, may be some combination thereof, and so forth.

The service provider 118 is associated with the server device 104 or with the font repository 120 to provide the end-user device 102 at least a portion of a font from the font database 116. The example scenario illustrated in FIG. 1 may be considered a "cloud-based" computing environment in which the end-user device 102 acquires fonts from the server device 104 that forms part of "the cloud." Generally, the service provider 118 may be a company or other entity that makes web resources, such as different fonts, available over the network 106 for usage by the end-user 108. In some situations, another end-user (not shown) that wishes to develop web sites or content powered by web standards may subscribe to a service of the service provider 118 that provides access to different fonts stored in the font database 116 for inclusion in a web page that the other end-user intends to place on the Web. The web page is then made available for access via a stand-alone or embedded web browsing application that executes at least partially on a client-side device, such as the end-user device 102.

The service provider 118 is associated with (e.g., owns, leases, or manages) the server device 104 and causes execution of the font instantiation module 110 located at the server device 104. The font database 116 stores multiple font definitions (not explicitly shown in FIG. 1) for multiple respective fonts. The server device 104 includes or otherwise has access to the font database 116. As shown, the font repository 120 includes a server device that at least has access to multiple font definitions, such as by being coupled to the font database 116. Alternatively, a font repository 120 may be implemented as a service, a library, a module, a storage unit, a combination thereof, etc. that is capable of providing a font description to a requester, with the font repository 120 being local to or remote from the requester.

The server device 104 is configured to provide at least a portion of a font via the network 106. Examples of a server device 104 include a web server, a server running open source software, a server of a proprietary design, a stand-alone server, a server blade, an allocated portion of a server farm, server functionality distributed across at least one data center, or some combination thereof. Although a single server device 104 is explicitly shown in FIG. 1, a server device 104 may be representative of a plurality of different devices or distributed computing resources that interoperate or coordinate to perform operations as a "web service," "over the cloud," or "in the cloud" as is known.

A font instantiation module 110 may be implemented as a software package; a hardware device; or using a combination of software, hardware, firmware, fixed logic circuitry; and so forth. A font instantiation module 110 may be implemented as a standalone component of a device 102 or 104 as illustrated in FIG. 1. Additionally or alternatively, a font instantiation module 110 may be configured as a component of another application, as a component of an operating system (OS) of a device on which it is executing (e.g., the OS of the end-user device 102 or the server device 104), as a plug-in or extension module, as a standalone service or as a service integrated with other services, as another device application or functionality, as a library available to another program, as an application programming interface (API) available to another program, or a combination thereof, and so forth.

As shown for an example operational scenario, the font instantiation module 110 of the end-user device 102 formulates the font request 112 and causes the font request 112 to be transmitted to the server device 104 via the network 106. In response, the font instantiation module 110 of the server device 104 prepares the font description 114 and causes the font description 114 to be transmitted to the end-user device 102 via the network 106. Generation, content, and usage of the font request 112 and the font description 114 are described below.

Figure 2:
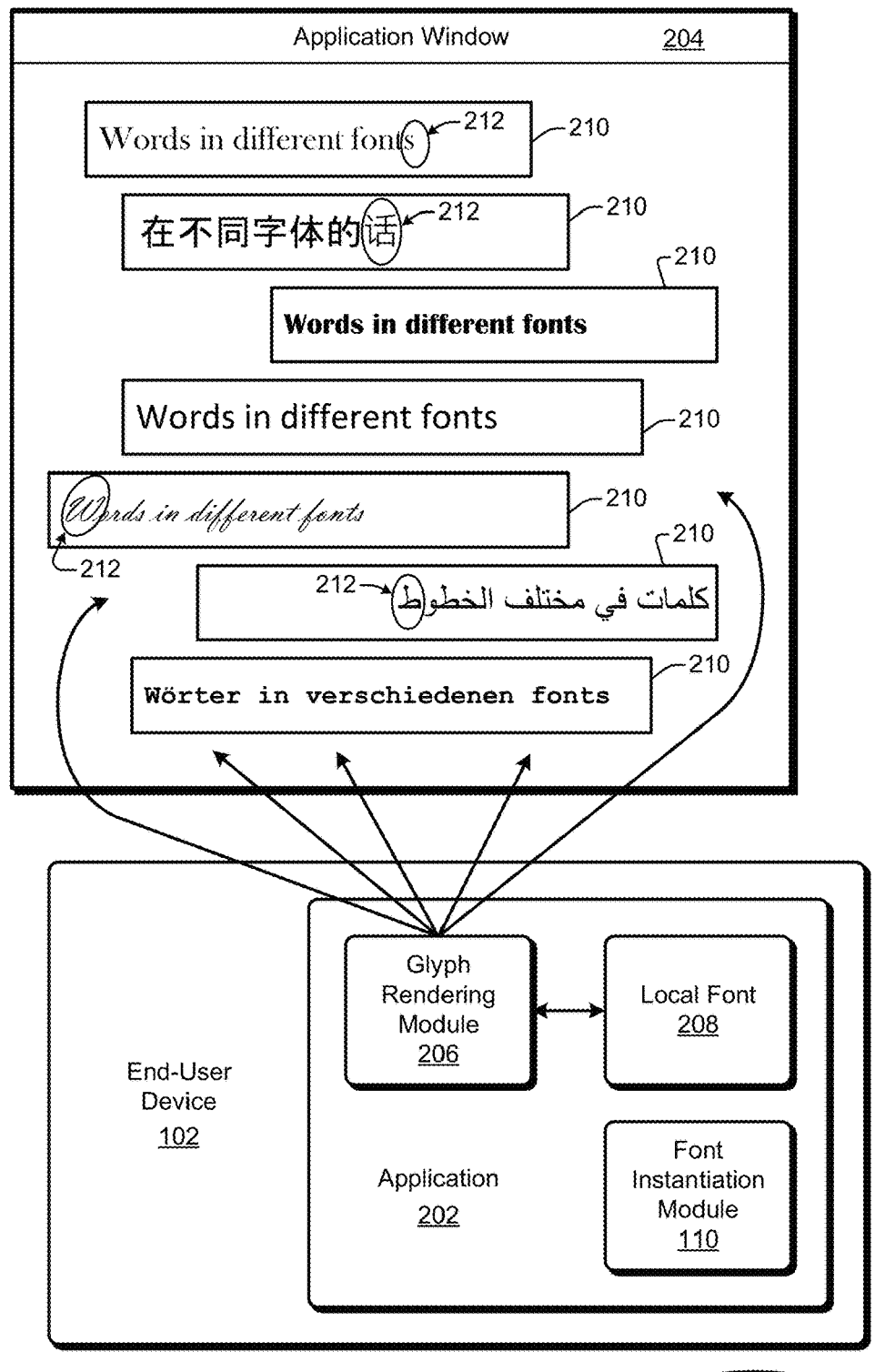
FIG. 2 illustrates a display scenario with an end-user device having an example application that renders characters in different fonts as corresponding glyphs.

FIG. 2 illustrates a display scenario 200 with an end-user device 102 having an example application 202 that renders characters in different fonts 210 as corresponding glyphs 212. As illustrated, the application 202 presents an application window 204 for the end user 108 via a display screen, a projector, or similar. The application 202 includes a glyph rendering module 206 and a local font 208, as well as a font instantiation module 110. The application window 204 is shown having multiple different fonts 210. Each different font 210 includes information on how to render at least one glyph 212. Several of the glyphs 212, as rendered in the application window 204, are explicitly indicated by an oval and a reference number in FIG. 2.

As the end user 108 obtains different textual content over time, like when the end user 108 traverses the Web and downloads web pages, the different textual content may be designed to use various different fonts. There are many languages throughout the world. Some of the example fonts 210 that are shown are directed to English, Chinese (simplified), Arabic, and German. Furthermore, for at least the more heavily-used languages, hundreds of fonts have been designed for a single language. Consequently, fonts 210 are acquired as-needed over time as the end user 108 obtains different textual content that is to be presented in the application window 204.

After a font 210 is obtained locally and stored as at least one local font 208, the local font 208 can be used to render glyphs 212 in accordance with the font attributes or glyph data of the local font 208. The local font 208 may be implemented as, for instance, a file, a database, or a combination thereof. If the application 202 wishes to display the word "cat," for example, the glyph rendering module 206 consults the local font 208 to determine how to render (e.g., draw or activate pixels for) the individual letters "c," "a," and "t." The glyph rendering module 206 may also learn from the local font 208 how the different glyphs 212 interact with each other. For example, the letter "a" may be pushed against or into the open curve of the letter "c," or the crossing line of the letter "t" may be connected to the top of the letter "a."

The font instantiation module 110, the glyph rendering module 206, and the local font 208 are shown as being part of the application 202. However, any one or more of these may alternatively be separate from the application 202. For example, the font instantiation module 110 may be a separate application, or the local font 208 may be part of an OS (not shown) of the end-user device 102.

Having considered an example environment, consider now a discussion of some example details of the systems or techniques for acquisition of a font portion using a compression mechanism in accordance with one or more embodiments.

Systems and Techniques

Figure 3:
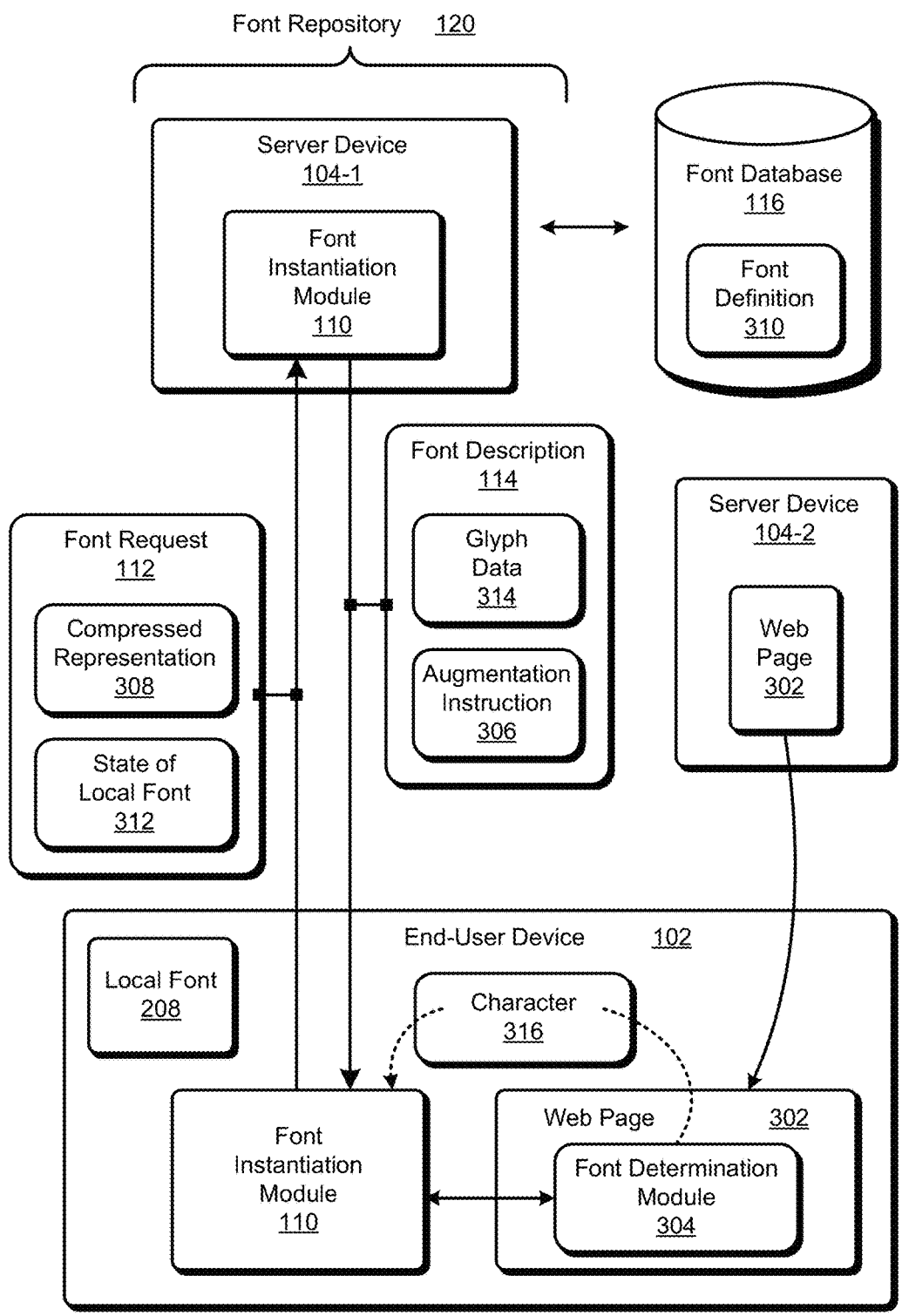
FIG. 3 depicts an example scenario in which an end-user device is able to acquire a portion of a font from a server device responsive to a font request.

FIG. 3 depicts an example scenario 300 in which an end-user device 102 is able to acquire a portion of a font from a server device 104-1 responsive to a font request 112. FIG. 3 depicts two server devices: the server device 104-1 and a server device 104-2. The server device 104-1 is implemented as a font repository 120, and the server device 104-2 is implemented as a web server offering web pages. As illustrated, the scenario 300 also includes the font request 112, the font description 114, the font database 116, and an indication of the font repository 120. The font database 116 stores multiple font definitions 310 for multiple fonts.

In an example web-related environment, the server device 104-2 functions as a web server that is capable of providing information via the Web, such as a web page 302. Using an application, such as a web browser, the end-user device 102 downloads the web page 302. The web page 302 includes multiple characters 316 that are to be displayed by the end-user device 102 as glyphs 212 (e.g., of FIG. 2) in accordance with one or more fonts. The web page 302 may include a font determination module 304. The font determination module 304 determines which one or more fonts are used by the web page 302 and which characters 316 are included in the web page 302. The font determination module 304 may be implemented as, for example, JavaScript code. The font determination module 304 may be preloaded with the font and character information, or the font determination module 304 may scan the e.g. textual contents of the web page 302 if or when the web page 302 is downloaded or is to be displayed, printed, or otherwise rendered.

The font instantiation module 110 of the end-user device 102 communicates with the font determination module 304 to determine which characters 316 are included in the web page 302. The font instantiation module 110 is capable of determining if a specified local font 208 is already present at the end-user device 102. If so, the font instantiation module 110 is further capable of determining if the specified local font 208 already includes the characters 316 that are to be displayed. If so, the glyph rendering module 206 (of FIG. 2) can render the corresponding glyphs 212 for the determined characters 316 of the web page 302 using the local font 208 without acquiring a font portion.

On the other hand, if the specified font is not present at the end-user device 102, the font instantiation module 110 is configured to request a subset of the specified font from the font repository 120 to establish a new local font 208. This font subsetting aspect is described below. Alternatively, if the specified font is present at the end-user device 102 but one or more corresponding glyphs that are to be displayed are missing, the font instantiation module 110 is configured to request a font augmentation from the font repository 120 to add to the existing local font 208. This font augmentation aspect is described further below particularly with reference to FIG. 6. Although not shown as such in FIG. 3, the web page 302 may omit the font determination module 304. In such cases, the font instantiation module 110 may independently or directly scan the web page 302 or other text-based content to determine what font data may be helpful to have as part of the local font 208.

In one or more embodiments, the font instantiation module 110 generates the font request 112. The font instantiation module 110 populates the font request 112 with a compressed representation 308 and may also include a state of the local font 312. The state of the local font 312 reflects a current content of the local font 208 for a font augmentation scenario, which is described further below with reference to FIG. 6. The compressed representation 308 is computed responsive to the multiple characters 316 that are determined to be relevant for rendering the web page 302. The compressed representation 308 may be computed, for example, based on multiple code points that respectively correspond to the multiple characters 316. An example computation of a compressed representation 308 is described below with reference to FIG. 4. The font request 112 may be implemented as, for instance, a URL that is submitted to a web server and may traverse multiple proxy servers of the Web. The font instantiation module 110 at the end-user device 102 causes the font request 112 to be transmitted to the server device 104-1.

At the server device 104-1, the font instantiation module 110 receives the font request 112. The compressed representation 308 is decoded to identify the multiple code points so as to ascertain at least the multiple characters 316 that were determined by the font determination module 304 to be relevant to rendering the web page 302. The font instantiation module 110 accesses the font definition 310 of the font database 116 to extract font attributes for multiple glyphs corresponding to the multiple characters 316. The font instantiation module 110 prepares the font description 114 using the extracted font attributes. The font description 114 is populated with glyph data 314 and may include at least one augmentation instruction 306. The glyph data 314 is derived from the font attributes and describes how to render characters 316 as glyphs 212 individually or in concert with other characters 316 for the specified font. The augmentation instruction 306 indicates how to add the glyph data 314 to an existing local font 208, which is described further below with reference to FIG. 6 for a font augmentation scenario. If the font request 112 does not pertain to a font augmentation scenario, the state of the local font 312 may be omitted from the font request 112, and the augmentation instruction 306 may be omitted from the font description 114.

The font instantiation module 110 at the server device 104-1 packages the glyph data 314 and the augmentation instruction 306 as the font description 114. The font instantiation module 110 causes the server device 104-1 to transmit the font description 114 to the end-user device 102. The font instantiation module 110 at the end-user device 102 receives the font description 114 and uses the font description 114 to produce the local font 208. The resulting local font 208 is a version of the font definition 310 and includes the multiple glyphs 212 that are to be rendered for the web page 302 as per the determined characters 316.

Figure 4:
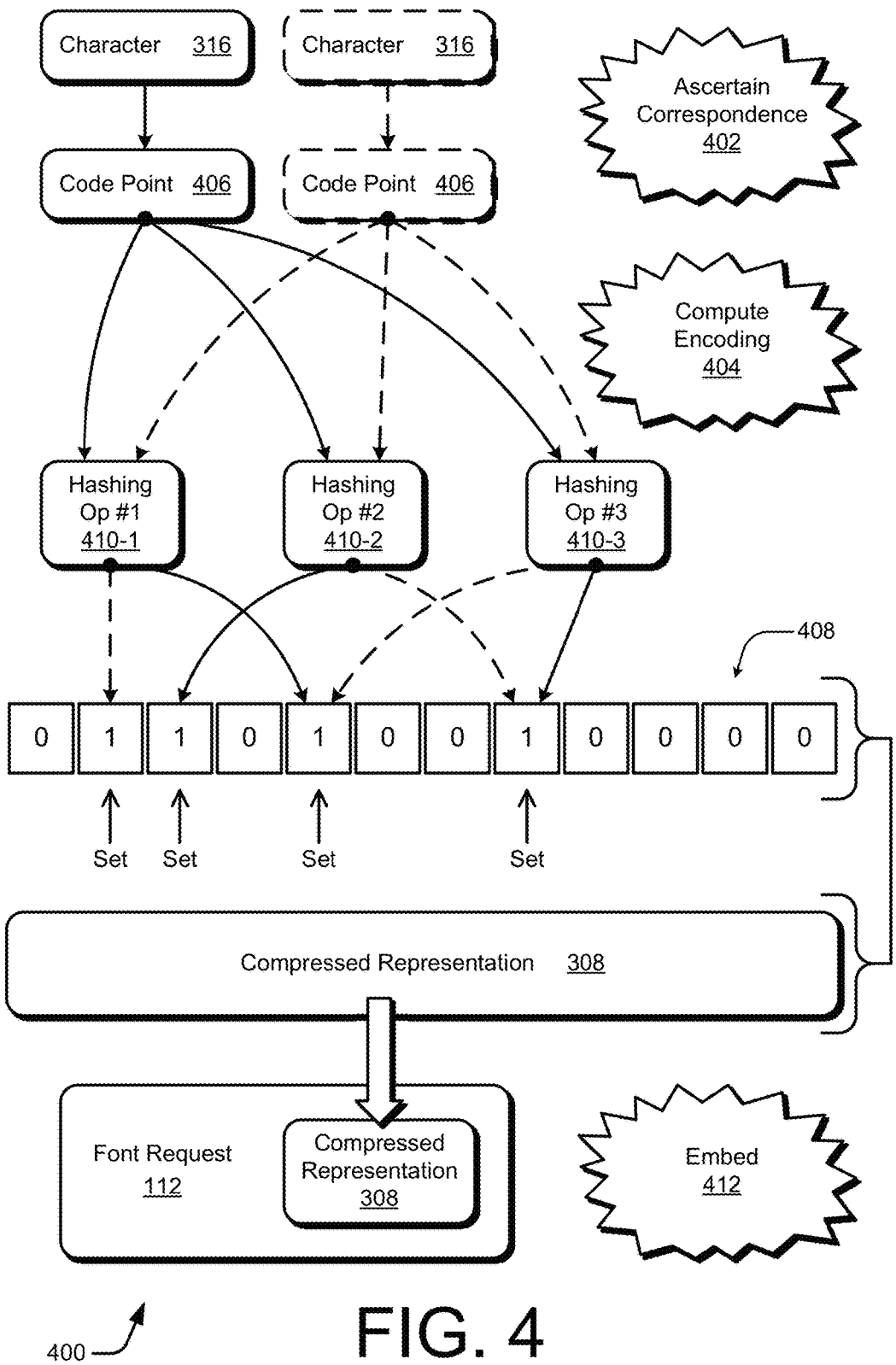
FIG. 4 illustrates an example approach by an end-user device for generating a font request.

FIG. 4 illustrates an example approach 400 by an end-user device for generating a font request 112. As shown, the approach 400 includes multiple characters 316, multiple code points 406, multiple hashing operations 410, a probabilistic data structure 408, and a compressed representation 308. The approach 400 also depicts multiple operations: an ascertaining a correspondence operation 402, a computing an encoding operation 404, and an embedding operation 412.

In one or more example embodiments, the compressed representation 308 is implemented as the probabilistic data structure 408. Although many characters 316 may be encoded in a single probabilistic data structure 408, for the sake of clarity two different characters 316 are illustrated as being encoded in FIG. 4. The character 316 on the left, as well as the corresponding code point 406 and multiple related arrows, is depicted with solid lines. The character 316 on the right, as well as the corresponding code point 406 and multiple related arrows, is depicted with dashed lines.

Each character 316 corresponds to a code point 406. The code points 406 may apply to a single given font definition 310 (e.g., of FIG. 3), may relate to multiple font definitions 310, may be universally adopted (e.g., Unicode code points), and so forth. A code point 406 may be implemented, for example, as a multi-digit alphanumeric set of characters, such as a four-digit numeral. For instance, the code points 406 may be realized with Unicode code point formatting. For the ascertaining a correspondence operation 402, the code points 406 are ascertained, with the multiple code points 406 respectively corresponding to the multiple characters 316 that are to be requested. For example, a starry-eyed smiling emoji character may correspond to a code point of "47822." A set of three comma-separated code points 406, one of which corresponds to the smiling emoji, may therefore be: "78,559,47822". Each of these three code points is then encoded into the probabilistic data structure 408.

The probabilistic data structure 408 includes multiple fields that may be set (e.g., assigned a value of "1") or cleared (e.g., assigned a value of "0"). The probabilistic data structure 408 may be created using any one or more of many available algorithms or strategies. Examples include a Bloom filter, a hyperlog, a kinetic hanger, locally-sensitive hashing, a minihash, a quotient filter, a random tree, a skip list, or some combination thereof. By way of example but not limitation, a Bloom filter technique is applied to the multiple code points 406 for the two approaches of FIGS. 4 and 5.

For the computing an encoding operation 404, each field of the probabilistic data structure 408 is initially cleared. The font instantiation module 110 of the end-user device 102 applies each code point 406 to multiple hashing operations 410 and the probabilistic data structure 408 is programmed accordingly. As shown, three hashing operations 410-1, 410-2, and 410-3 are employed. However, more or fewer hashing operations 410 may alternatively be employed.

In an example Bloom filter implementation, each code point 406 is hashed three times, once by each hashing operation 410-1, 410-2, and 410-3. Each hashing operation 410 hashes the code point 406 to a field of the probabilistic data structure 408. The font instantiation module 110 sets each field to which a hashing operation 410 maps a given code point 406. For the left code point 406 with the solid lines, the third, fifth, and eighth fields are set. For the right code point 406 with the dashed lines, the second, fifth, and eighth fields are set. With a Bloom filter, two or more different code points 406 may map to the same group of fields, depending on the number or types of hashing operations 410 and the length or size of the probabilistic data structure 408. A likelihood of such duplicative mapping can be managed, if not entirely eliminated, by adjusting the number of hashing operations 410, the size of the probabilistic data structure 408, the types of hashing operations 410 that are employed, some combination thereof, and so forth.

After the multiple code points 406 corresponding to the multiple characters 316 have each been hashed and used to program the probabilistic data structure 408, the compressed representation 308 has been computed. The font instantiation module 110 (e.g., of FIG. 3) performs the embedding operation 412 by inserting the compressed representation 308 into the font request 112. Although not explicitly shown, the font instantiation module 110 can also specify a font by including in the font request 112 an indication of the appropriate rendering font, such as an identification of a font definition 310. If the font request 112 is implemented as a URL, the font request 112 can also include an internet address of the targeted server device on the web.

Figure 5:
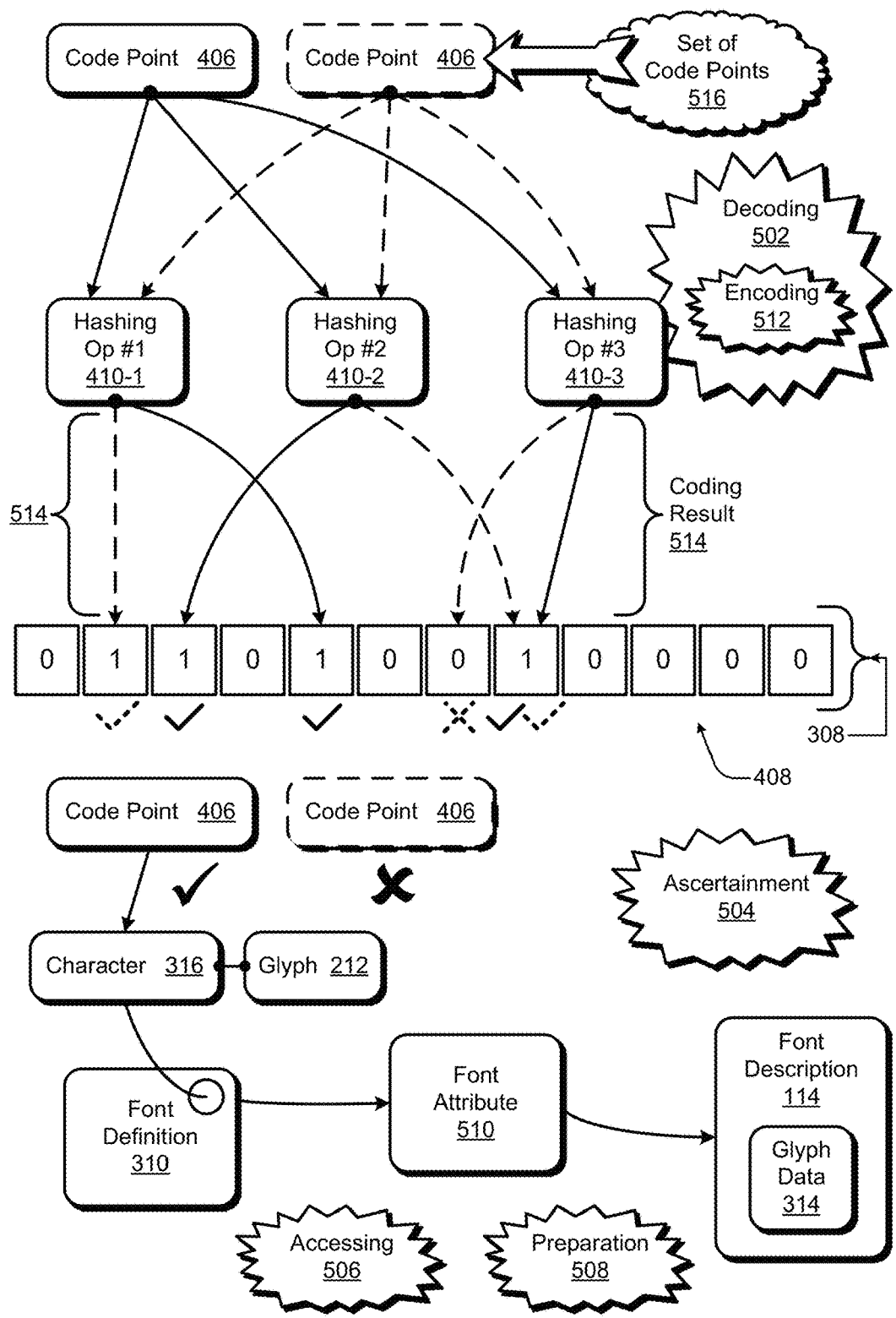
FIG. 5 illustrates an example approach by a server device for generating a font description to respond to a font request.

FIG. 5 illustrates an example approach 500 by a server device for generating a font description 114 to respond to a font request 112 (e.g., of FIG. 3 or 4). As illustrated, the approach 500 includes multiple operations: a decoding operation 502, an ascertainment operation 504, an accessing operation 506, and a preparation operation 508. A probabilistic data structure 408 may be used to implement a compressed representation 308. To decode a probabilistic data structure 408, each encoded character 316 of an indicated font is tested to determine if the character 316 is being requested. With a given font definition, each character 316 corresponds to a code point 406. Thus, each code point 406 of a set of code points 516 for a given font definition is decoded as part of the decoding operation 502.

Although the code points 406 may number in the hundreds or thousands or more, two code points 406 are shown for the sake of clarity. The code point 406 on the left, as well as multiple related arrows, is depicted with solid lines. The code point 406 on the right, as well as multiple related arrows, is depicted with dashed lines. Part of the decoding operation 502 may include an encoding operation 512. With the encoding operation 512 for an example Bloom filter implementation, the font instantiation module 110 (e.g., of the server device 104-1 of FIG. 3) applies the multiple hashing operations 410 to each of the code points 406 of the set of code points 516 to calculate multiple coding results 514 (e.g., to calculate multiple hashing results). The multiple coding results 514 may be calculated in response to a received font request 112 (e.g., of FIG. 3). Alternatively, the multiple coding results 514 may be pre-calculated for each set of code points 516 for each font definition 310 and retained for subsequent comparison with a received compressed representation 308.

As part of the decoding operation 502, the font instantiation module 110 compares the multiple coding results 514 to the fields of the probabilistic data structure 408 to identify those code points 406 that match the compressed representation 308. For the code point 406 on the left with solid lines, each hashing operation 410 maps to a field that is set, as indicated by the solid check marks under the probabilistic data structure 408. Consequently, a character corresponding to the left code point 406 is deemed to have been requested by the end-user device 102, as indicated by a large stylized check mark under the left code point 406 that is depicted below the probabilistic data structure 408. In contrast, for the code point 406 on the right with dashed lines, two of the hashing operations 410-1 and 410-2 map to fields that are set, as indicated by the dashed check marks. However, the hashing operation 410-3 maps to a field that is not set, as indicated by the dashed "x" mark. Consequently, a character corresponding to the right code point 406 is not deemed to have been requested by the end-user device 102, as indicated by a large stylized "X" mark under the right code point 406 that is depicted below the probabilistic data structure 408.

For the ascertainment operation 504, each character 316 that corresponds to a matching code point 406 is ascertained. For example, a code point of "2374" may be ascertained to correspond to the letter "u" with an umlaut (e.g., "ü"). The ascertained character 316 corresponds to a glyph 212. The font instantiation module 110 accesses the font definition 310 with reference to the ascertained character 316 to extract at least one font attribute 510. The font attribute 510 may include instructions for, or an explanation of how, the corresponding glyph 212 is to be rendered. For example, the font attribute 510 may be implemented as a vector-based representation of the glyph 212.

The ascertainment operation 504 and the accessing operation 506 are repeated for each code point 406 and corresponding character 316 that is determined to comport with the compressed representation 308 as part of the decoding operation 502. As part of the preparation operation 508, the font instantiation module 110 packages the multiple font attributes 510 to include the rendering information in the font description 114 as the glyph data 314. The glyph data 314 may pertain to individual glyphs 212 or a grouping of glyphs 212.

The approaches 400 and 500 described above with reference to FIGS. 4 and 5 are applicable to situations in which a font subset is being newly instantiated at the end-user device 102 as a new local font 208. However, these approaches can be extended to apply to situations in which an existing local font 208 is augmented by adding multiple glyphs 212 for multiple corresponding characters 316 to the existing local font 208. An example implementation for this font augmentation is described below with reference to FIG. 6.

Figure 6:
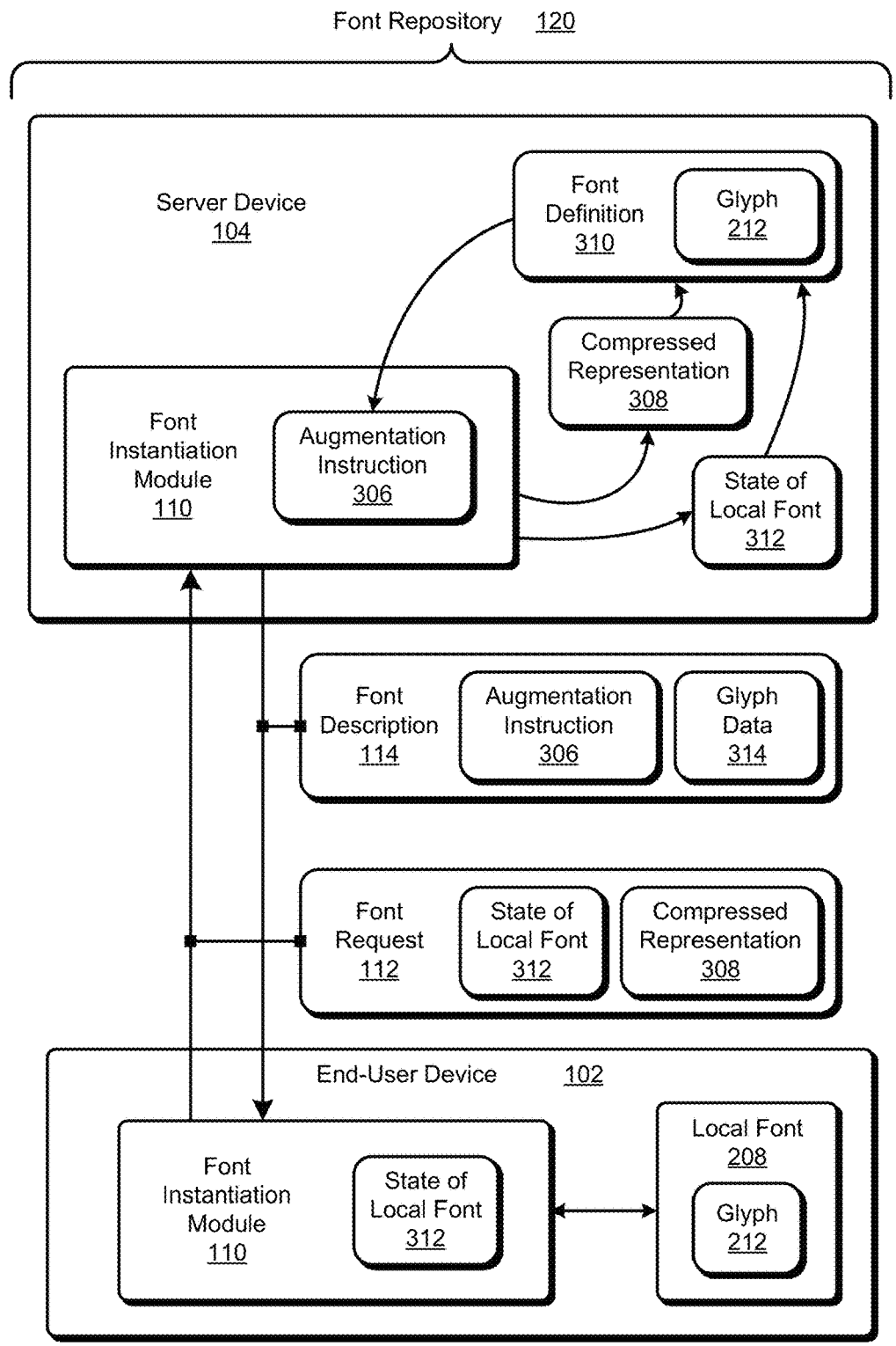
FIG. 6 depicts an example scenario in which an end-user device is able to acquire a portion of a font from a server device in a font augmentation situation.

FIG. 6 depicts an example scenario 600 in which an end-user device 102 is able to acquire a portion of a font from a server device 104 in a font augmentation situation. During web browsing, a situation may arise in which an existing local font 208, which does correspond to an indicated font, nevertheless fails to include data for a glyph 212 corresponding to a character 316 that an application wishes to render. For example, while inputting personal information for a form, an end user may enter on a web page new characters that are not present in the local font 208. Downloading a completely new font portion that also includes glyph data for the new characters can be time consuming or bandwidth intensive. On the other hand, merely tagging new glyphs 212 onto the end of a local font 208 may result in a local font 208 that is large and unwieldy or even defective, especially if more glyphs 212 are repeatedly added to the local font 208.

However, the local font 208 can be maintained in a usable and continuously extensible form if new glyphs 212 are carefully added to an existing local font 208. For example, the local font 208 can be configured to mimic a miniature version of the font definition 310 as glyph rendering data for each new group of glyphs 212 are added. This reconfiguration of the local font 208 can be effectuated using an augmentation instruction 306.

In one or more embodiments, the font instantiation module 110 at the end-user device 102 analyzes the existing local font 208 to determine a current content of the local font 208. This current content, such as which glyphs 212 are already present, is realized as the state of the local font 312. For example, the font instantiation module 110 can create a data structure that indicates each glyph 212 that is already present in the existing local font 208. A bit can be set (or cleared), for instance, to indicate that an associated glyph 212 is present (or not present). However, alternative data structures or techniques can be implemented to encode in the state of the local font 312 the presence or absence of glyphs 212 in the existing local font 208.

The font instantiation module 110 includes the state of the local font 312 in the font request 112 along with the compressed representation 308. The font instantiation module 110 also causes the end-user device 102 to transmit the font request 112 to the server device 104. Although the compressed representation 308 and the state of the local font 312 may be combined into one packet or other communication unit, e.g., a single URL, each may alternatively be communicated to the server device 104 separately or over two or more communication units. The server device 104 receives the font request 112 having the state of the local font 312 and provides the font request 112 to the font instantiation module 110 at the server device 104.

At the server device 104, the font instantiation module 110 uses the compressed representation 308 and the state of the local font 312, in conjunction with the font definition 310, to prepare the augmentation instruction 306. From the state of the local font 312, the font instantiation module 110 determines which glyphs 212 are already present at the local font 208. From the compressed representation 308, the font instantiation module 110 determines which new characters 316 are being requested. The augmentation instruction 306 is prepared so as to be indicative of how to add data for the multiple new glyphs 212 that correspond to the requested characters 316 to the existing local font 208 given that certain glyphs 212 are already present as part of the local font 208.

For example, the augmentation instruction 306 can indicate how the new glyphs 212 are to be integrated with the existing glyphs 212 by reordering the combined set of glyphs 212 in the local font 208. The combined and reordered glyphs 212 may also be assigned a new local ordering number for the local font 208. The augmentation instruction 306 can be configured so that the updated local font 208 approximates the font definition 310 to the extent practicable given that the local font 208 is but a portion of the entirety of the full font. In this manner, if new glyphs 212 are continually added to the local font 208 until each of the possible glyphs 212 of the font definition 310 have been added, the local font 208 will eventually be rearranged by the augmentation instructions 306 so as to be configured as if the entirety of the font definition 310 was originally requested as a complete set of glyphs 212 for the specified font.

The font instantiation module 110 of the server device 104 generates the font description 114 to include the glyph data 314 and the augmentation instruction 306. The font instantiation module 110 causes the server device 104 to transmit the font description 114 to the end-user device 102. The font instantiation module 110 at the end-user device 102 uses the augmentation instruction 306, along with the newly-received glyph data 314, to augment the existing local font 208 by adding the multiple glyphs 212 that correspond to the multiple requested characters 316 to the local font 208. For example, the font instantiation module 110 may inject the multiple glyphs 212 into the local font 208 based on the augmentation instruction 306 to produce an updated glyph order for the local font 208 and may renumber the glyphs 212 of the local font 208 in accordance with the updated glyph order.

Having discussed example details of systems, techniques, and schemes for acquisition of a font portion using a compression mechanism, consider now some example procedures to illustrate additional aspects of the techniques.

Example Procedures

Figure 7:
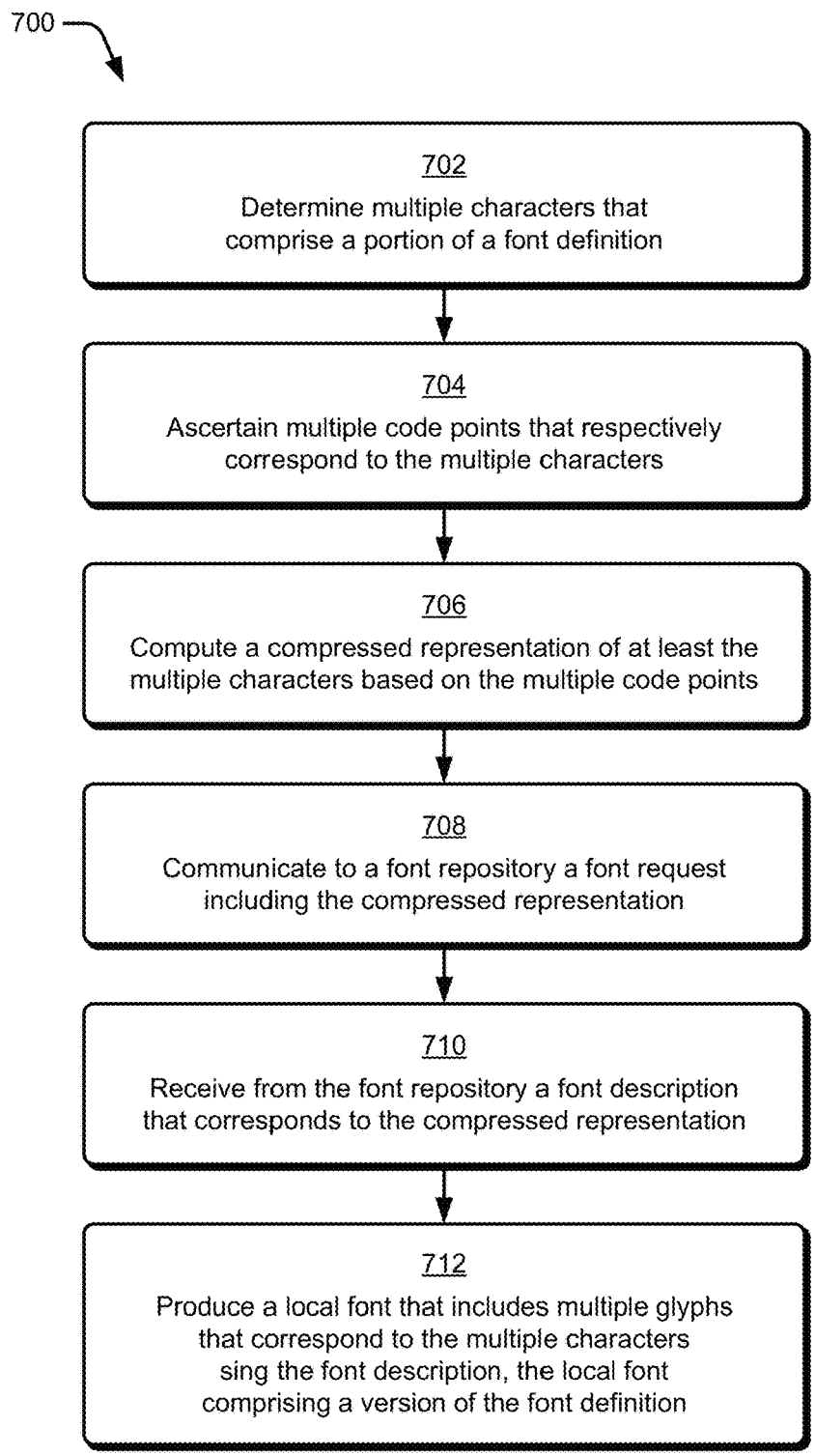
FIG. 7 is a flow diagram illustrating an example procedure for an end-user device in accordance with one or more example embodiments.
Figure 8:
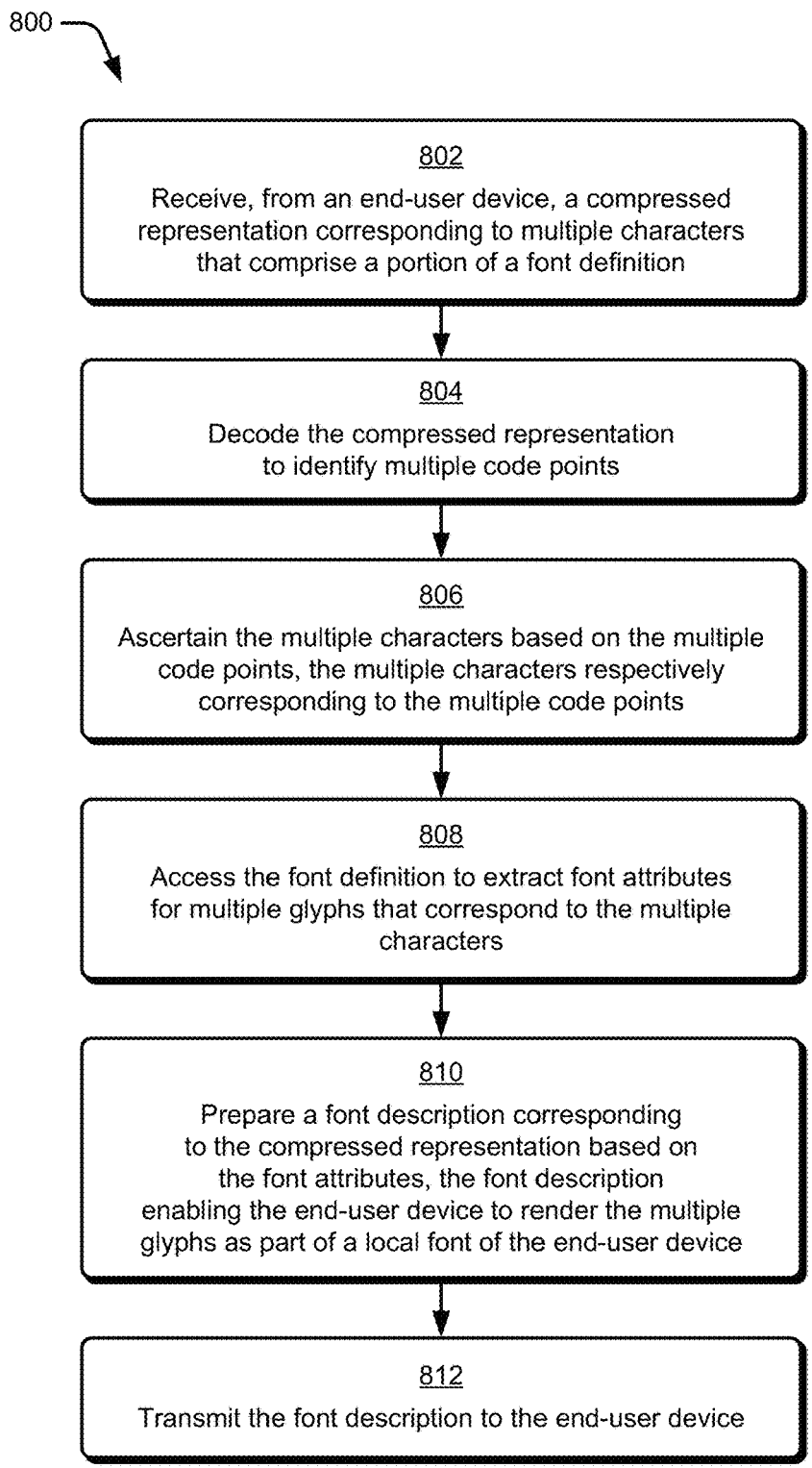
FIG. 8 is a flow diagram illustrating an example procedure for a server device in accordance with one or more example embodiments.

This section describes with reference to FIGS. 7 and 8 example procedures relating to acquisition of a font portion using a compression mechanism in one or more embodiments. Aspects of the procedures may be implemented in hardware, firmware, or software, or a combination thereof. The procedures are shown as sets of blocks that specify operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example end-user device 102 for FIG. 7 or an example server device 104 for FIG. 8, that makes use of a font instantiation module 110.

FIG. 7 is a flow diagram that includes six blocks 702-712 and that illustrates an example procedure 700 for an end-user device 102 that is performing an implementation for acquisition of a font portion using a compression mechanism in accordance with one or more example embodiments. At operation 702, multiple characters that form a portion of a font definition are determined. For example, an end-user device 102 can determine multiple characters 316 that form a portion of a font definition 310. To do so, a font instantiation module 110 may communicate with a font determination module 304 to determine what characters 316 are to be displayed and may access a local font 208 to determine what glyphs 212 that are to be displayed are not already included in the local font 208. A font instantiation module 110 scans a file (e.g., a document or web page) to detect characters 316. Detected characters 316 that do not have corresponding glyphs 212 in the local font 208 are thereby determined. The characters 316 can be detected in any of multiple possible representations, such as a glyph form, an identifying numeral, a code point, a combination thereof, and so forth.

At operation 704, multiple code points that respectively correspond to the multiple characters are ascertained. For example, the end-user device 102 can ascertain multiple code points 406 that respectively correspond to the multiple characters 316. The font instantiation module 110 may, for instance, ascertain what universal code points, such as Unicode code point values, correspond to the characters 316 that are to be requested. If the characters 316 are detected as code points that can be used to make a request (e.g., Unicode code point values) as part of operation 702, the ascertainment of operation 704 can be jointly or simultaneously performed with the determination of operation 702, or the ascertainment of operation 704 can confirm that suitable code points are already ascertained.

At operation 706, a compressed representation of at least the multiple characters is computed based on the multiple code points. For example, the end-user device 102 can compute a compressed representation 308 of at least the multiple characters 316 based on the multiple code points 406. To effectuate the computation, the font instantiation module 110 may apply a Bloom filter technique to the multiple code points 406 to create a probabilistic data structure 408.

At operation 708, a font request including the compressed representation is communicated to a font repository. For example, the end-user device 102 can communicate to a font repository 120 a font request 112 including the compressed representation 308. To do so, the font instantiation module 110 may cause the end-user device 102 to transmit a font request 112, which includes the probabilistic data structure 408, to a server device 104 that has access to a font database 116 via a network 106. The font request 112 may be implemented as a URL that points to the server device 104 and includes as a portion thereof fields of the probabilistic data structure 408.

At operation 710, a font description that corresponds to the compressed representation is received from the font repository. For example, the end-user device 102 can receive from the font repository 120 a font description 114 that corresponds to the compressed representation 308. The font description 114 may include glyph data 314 for at least each glyph 212 corresponding to a character 316 that was encoded into the probabilistic data structure 408 to create the compressed representation 308.

At operation 712, a local font that includes multiple glyphs that correspond to the multiple characters is produced using the font description, with the local font thereby realizing a version of the font definition. For example, the end-user device 102 can produce a local font 208 that includes the multiple glyphs 212 that correspond to the multiple characters 316 using the font description 114, with the resulting local font 208 therefore forming a version of the font definition 310. For instance, the local font 208 may be created such that the multiple glyphs 212, which correspond to the multiple requested characters 316, that are included in the local font 208 can be rendered just as if an entirety of a font definition 310 were used to create the local font 208.

FIG. 8 is a flow diagram that includes six blocks 802-812 and that illustrates an example procedure 800 for a server device 104 that is performing an implementation for acquisition of a font portion using a compression mechanism in accordance with one or more example embodiments. At operation 802, a compressed representation, which corresponds to multiple characters that form a portion of a font definition, is received from an end-user device. For example, a server device 104 can receive, from an end-user device 102, a compressed representation 308 corresponding to multiple characters 316 that form a portion of a font definition 310. The effectuate the receipt, the server device 104 may process a URL and extract a portion thereof that forms a probabilistic data structure 408 in which multiple code points 406 have been encoded. The URL may also indicate a particular font 210.

At operation 804, the compressed representation is decoded to identify multiple code points. For example, the server device 104 can decode the compressed representation 308 to identify multiple code points 406. To do so, a font instantiation module 110 may produce coding results 514 using code points 406 for glyphs 212 and corresponding characters 316 of a set of code points 516 for a font definition 310 of an indicated font 210. The font instantiation module 110 may further compare the coding results 514 to the probabilistic data structure 408 to determine which code points 406 match the compressed representation 308 so as to identify matching code points 406.

At operation 806, the multiple characters are ascertained based on the multiple code points, with the multiple characters respectively corresponding to the multiple code points. For example, the server device 104 can ascertain the multiple characters 316 based on the multiple code points 406, with the multiple characters 316 respectively corresponding to the multiple code points 406. For instance, using the font definition 310 for the indicated font 210 or a general correspondence table for Unicode code points as well as the identified matching code points 406, the font instantiation module 110 may ascertain at least the multiple characters 316 that were requested by the end-user device 102. The font instantiation module 110 may additionally ascertain one or more characters 316 that were not intentionally requested by the end-user device 102 due to potential false positives with the compressed representation 308.

At operation 808, the font definition is accessed to extract font attributes for multiple glyphs that correspond to the multiple characters. For example, the server device 104 can access the font definition 310 to extract font attributes 510 for the multiple glyphs 212 that correspond to the multiple identified characters 316. To effectuate the extraction, the font instantiation module 110 may isolate from the font definition 310 of the indicated font 210 those instructions that describes how to render glyphs 212 for at least the multiple characters 316 that were requested by the end-user device 102.

At operation 810, a font description corresponding to the compressed representation is prepared based on the font attributes, with the font description enabling the end-user device to render the multiple glyphs as part of a local font of the end-user device. For example, the server device 104 can prepare a font description 114 corresponding to the compressed representation 308 based on the font attributes 510, with the font description 114 enabling the end-user device 102 to render the multiple glyphs 212 as part of a local font 208 of the end-user device 102. To do so, the font instantiation module 110 may prepare a font description 114 so as to include glyph data 314 that serves as instructions (e.g., a vector representation) for displaying at least the multiple glyphs 212 corresponding to the multiple characters 316 that were requested by the end-user device 102. For a font augmentation scenario, the font description 114 may additionally be prepared so as to include at least one augmentation instruction 306 to describe how the end-user device 102 can incorporate the glyph data 314 into an existing local font 208.

At operation 812, the font description is transmitted to the end-user device. For example, the server device 104 can transmit the font description 114 to the end-user device 102. The server device 104, which is acting as a font repository 120, may download the font description 114 to an instance of a font instantiation module 110 that is executing at the end-user device 102.

Having described example procedures in accordance with one or more embodiments, consider now an example system and device that can be utilized to implement the various schemes and techniques described herein.

Example System and Device

Figure 9:
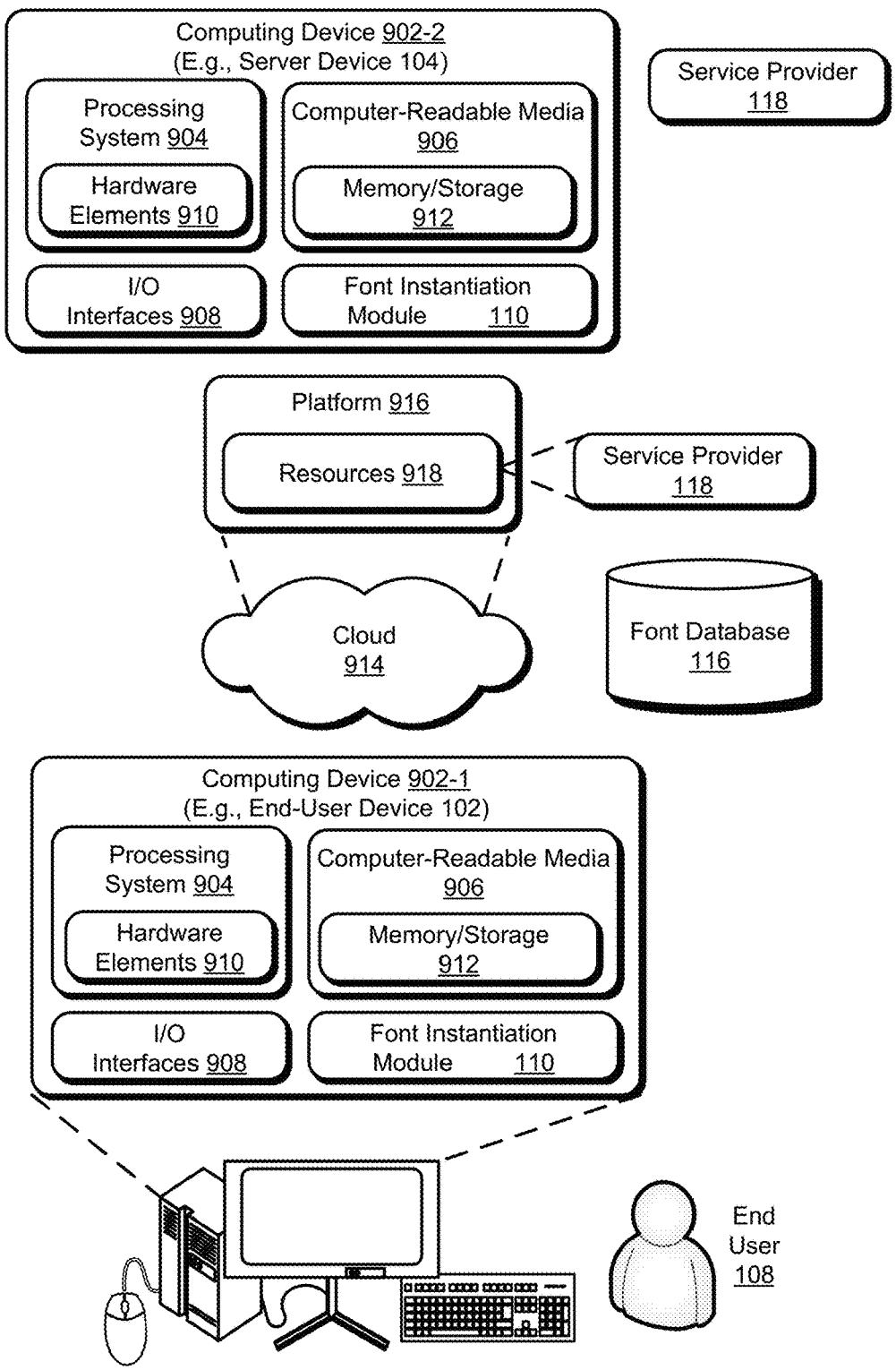
FIG. 9 illustrates an example system including various components of two example devices that can be employed for one or more embodiments of acquisition of a font portion using a compression mechanism.

FIG. 9 illustrates an example system generally at 900 that includes example computing devices 902 that are representative of one or more computing systems or computing devices that may implement the various techniques described herein. This is illustrated through the inclusion of two font instantiation modules 110, either or both of which may operate as described herein above, as well as a font database 116. A computing device 902 may comprise, for example, an end-user device (e.g., a client device) of an end user 108, a server device of a service provider 118, an on-chip system or system-on-a-chip (SOC), or any other suitable computing device or computing system. An example end-user device 102 is represented by computing device 902-1, and an example server device 104 is represented by computing device 902-2.

The example computing devices 902 as illustrated include at least one processing system 904, one or more computer-readable media 906, and one or more I/O interfaces 908 that may be communicatively coupled, one to another. Although not explicitly shown, each computing device 902 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit (ASIC) or other logic device formed using e.g. one or more semiconductors. The hardware elements 910 are not limited by the materials from which they are formed or the processing mechanisms employed therein. For example, processors may be comprised of semiconductor(s) or transistors (e.g., electronic integrated circuits (ICs)). In such a context, processor-executable instructions may comprise electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) or nonvolatile media (such as read only memory (ROM), flash memory, optical discs, magnetic disks, etc.). The memory/storage component 912 may include fixed media (e.g., RAM, ROM, or a fixed hard drive formed from electromagnetic disks or flash memory) or removable media (e.g., flash memory, a removable hard drive, or an optical disc). The computer-readable media 906 may be configured in a variety of other ways as further described below.

Input/output interface(s) 908 are representative of functionality to allow a user to enter commands or information to computing device 902 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are configured to detect physical touch), a camera (e.g., which may employ visible or non-visible wavelengths such as infrared frequencies to recognize movement as gestures that need not involve touch), or a combination thereof. Examples of output devices include a display device (e.g., an LCD or LED screen, a monitor, or a projector), a speaker, a printer, a network card, a haptic vibrating device, or a combination thereof. Thus, the computing device 902 may be configured in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or other storage device, tangible media, article of manufacture, or combination thereof that is suitable to store desired information and that may be accessed by a computer.

"Computer-readable signal media," as used herein, refers to a signal-bearing medium that is configured to transmit instructions to hardware of the computing device 902, such as via a network. Computer-readable signal media typically may embody computer readable instructions, data structures, program modules, or other data in a modulated data signal, such as carrier waves, data signals, or other transport mechanism. Computer-readable signal media may also include any information delivery media. The term "modulated data signal" means a signal that has one or more of its characteristics set or changed in such a manner as to encode information in the signal. By way of example, computer-readable signal media may include wired media, such as a wired network or direct-wired connection, and wireless media such as acoustic, RF, microwave, infrared, or other wireless media.

As previously described, the hardware elements 910 and the computer-readable media 906 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more of the hardware elements 910. The computing device 902 may be configured to implement particular instructions or functions corresponding to software or hardware modules. Accordingly, implementation of a module that is executable by the computing device 902 as software may be achieved at least partially in hardware, e.g., through use of computer-readable storage media or the hardware elements 910 of the processing system 904. The instructions or functions may be executable/operable by one or more articles of manufacture (e.g., one or more of the computing devices 902 or the processing systems 904) to implement techniques, modules, or examples described herein.

The techniques described herein may be supported by various configurations of the computing device 902 and are not limited to the specific aspects of the example devices described herein. This functionality may also be implemented fully or partially through use of a distributed system, such as over a "cloud" 914 via a platform 916 as described below.

The cloud 914 may include or represent a platform 916 for resources 918. The platform 916 abstracts underlying functionality of hardware (e.g., servers or data centers) and software resources of the cloud 914. The resources 918 may include applications or data that can be utilized while computer processing is at least partially executed on servers that are remote from, or distributed around, the computing device 902. Resources 918 may also include services provided over the Internet or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900, or at least throughout the cloud 914 along with a computing device 902, such as the computing device 902-2. For example, functionality may be implemented in part on a computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. At least one computing device operative in a digital medium environment to enable acquisition of a font portion that is specified in real-time using a compression mechanism that facilitates lossless identification of enumerated characters, the computing device configured to perform operations comprising:
    determining multiple characters that comprise a portion of a font definition, the multiple characters missing from a local font at the computing device;
    ascertaining multiple code points that respectively correspond to the multiple characters;
    computing a compressed representation of at least the multiple characters based on the multiple code points;
    embedding the compressed representation into a URL;
    communicating to a font repository a font request for at least the multiple characters that are missing from the local font, the font request comprising the URL with the compressed representation;
    receiving from the font repository a font description that corresponds to the compressed representation; and updating the local font with multiple glyphs that correspond to the multiple characters using the font description, the local font comprising a version of the font definition.

2. The computing device as described in claim 1, wherein the determining comprises detecting user input that includes the multiple characters.

3. The computing device as described in claim 1, wherein the multiple code points respectively comprise multiple Unicode code point values.

4. The computing device as described in claim 1, wherein the updating the local font comprises establishing the local font as including the multiple glyphs.

5. The computing device as described in claim 1, wherein the updating the local font comprises augmenting the local font by adding the multiple glyphs to the local font.

6. The computing device as described in claim 5, wherein:
the computing device is configured to perform operations that further comprise determining a state of the local font prior to the augmenting, the state representative of a current content of the local font; and
the communicating comprises communicating to the font repository the state of the local font.

7. The computing device as described in claim 6, wherein:
the font description includes an augmentation instruction configured to:
approximate the font description based on a data structure that indicates the glyphs initially included in the local font;
produce an updated glyph order for the local font based on the approximate font description to integrate the multiple glyphs with initial glyphs in the local font; and
renumber the glyphs of the local font in accordance with the updated glyph order.

8. The computing device as described in claim 1, wherein the computing device is configured to perform operations that further comprise rendering on a display screen at least one glyph of the multiple glyphs using the local font.

9. The computing device as described in claim 1, wherein:
the compressed representation is encoded resulting in at least one code point of the multiple code points correlating to more than one character; and
the receiving the font description from the font repository including all of the characters that correlate to the at least one code point and appearing to the font repository as having been requested.

10. The computing device as described in claim 9, wherein the computing the compressed representation comprises applying a Bloom filter technique to the multiple code points to produce the probabilistic data structure that represents the multiple characters.

11. The computing device as described in claim 1, wherein the computing the compressed representation comprises performing at least one hashing operation on each of the multiple code points such that false negatives are prevented but false positives are permitted if the compressed representation is decoded to identify the multiple code points.

12. At least one computing device operative in a digital medium environment to enable acquisition of a font portion that is specified in real-time using a compression mechanism that facilitates lossless identification of enumerated characters, the computing device configured to perform operations comprising:
receiving, from an end-user device, a URL that includes an embedded compressed representation corresponding to multiple characters that comprise a portion of a font definition, the multiple characters missing from a local font at the end-user device;
decoding the compressed representation to identify multiple code points;
ascertaining the multiple characters based on the multiple code points, the multiple characters respectively corresponding to the multiple code points, at least one code point of the multiple code points correlating to more than one character;
accessing the font definition to extract font attributes for multiple glyphs that correspond to the multiple characters, including all of the characters that correlate to the at least one code point and appear as having been requested;
preparing a font description corresponding to the compressed representation based on the font attributes, the font description enabling the end-user device to render the multiple glyphs as part of the local font of the end-user device; and
transmitting the font description to the end-user device.

13. The computing device as described in claim 12, wherein the decoding comprises identifying the multiple code points that correspond to the multiple characters, the multiple characters including each character that was intentionally encoded by the end-user device into the compressed representation and at least one character that was not intentionally encoded by the end-user device into the compressed representation.

14. The computing device as described in claim 12, wherein the decoding comprises:
performing at least one encoding operation on each code point corresponding to each character that is included in a set of code points for the font definition to produce multiple coding results; and
comparing the multiple coding results to the compressed representation to identify the multiple code points.

15. The computing device as described in claim 12, wherein the receiving comprises receiving, from the end-user device, a state of the local font, the state of the local font representative of a current content of the local font at the end-user device.

16. The computing device as described in claim 15, wherein the preparing comprises preparing an augmentation instruction based on the state of the local font and the multiple characters corresponding to the compressed representation, the augmentation instruction indicative of how to add the multiple glyphs to the local font.

17. The computing device as described in claim 12, wherein the compressed representation is computed by applying a Bloom filter technique to the multiple code points to produce the probabilistic data structure that represents the multiple characters.

18. A system implemented at least partially in hardware and operative in a digital medium environment to enable acquisition of a font portion that is specified in real-time using a compression mechanism that facilitates lossless identification of enumerated characters, the system comprising:
a font instantiation module configured to communicate a uniform resource locator (URL) that includes a probabilistic data structure representative of multiple characters that comprise a portion of a font definition, the multiple characters missing from a local font at an end-user device of the system, the probabilistic data structure incorporating multiple code points using a compression mechanism, the multiple code points respectively corresponding to the multiple characters, the probabilistic data structure embedded in the URL.

19. The system as described in claim 18, wherein:
the font instantiation module is further configured to:
  determine the multiple characters based on characters that are to be displayed by the end-user device;
  encode the multiple code points into the probabilistic data structure using at least one hashing operation;
  embed the probabilistic data structure in the URL;
  transmit to a font repository the URL that includes the probabilistic data structure;
  receive from the font repository a font description that describes how to render multiple glyphs that correspond to the multiple characters; and
  produce a local font that includes the multiple glyphs using the font description.

20. The system as described in claim 18, wherein:
the system comprises a server device having access to a font database that stores a font definition;
the font instantiation module is further configured to:
  receive from the end-user device the URL that includes the probabilistic data structure;
  decode the probabilistic data structure to identify the multiple code points, at least one code point of the multiple code points correlating to more than one character;
  using the font definition and based on the multiple code points, prepare a font description that describes how to render multiple glyphs that correspond to the multiple characters, including all of the characters that correlate to the at least one code point and appear as having been requested as encoded in the probabilistic data structure; and
  transmit to the end-user device the font description.

* * * * *